United States Patent [19]

McMillan

[11] 4,096,635
[45] Jun. 27, 1978

[54] NAVIGATIONAL COMPUTER

[76] Inventor: Lon M. McMillan, Regency Apartments 209-5, Warner Robins, Ga. 31093

[21] Appl. No.: 706,183

[22] Filed: Jul. 19, 1976

[51] Int. Cl.² .................. B43L 13/00; B43L 7/06; G06G 1/02
[52] U.S. Cl. .................................. 33/98; 33/76 V; 235/61 NV
[58] Field of Search ......... 235/61 NV, 78 N, 61 GM; 33/98, 76 VA, 1 SB

[56] References Cited

U.S. PATENT DOCUMENTS

| 1,828,807 | 10/1931 | Kennedy | 33/76 VA |
| 1,942,536 | 1/1934 | Clementi | 33/76 VA |
| 2,244,125 | 6/1941 | Siefker | 33/98 |
| 2,505,149 | 4/1950 | Schoenberg | 33/98 |
| 2,528,502 | 11/1950 | De Florez et al. | 235/61 NV |

FOREIGN PATENT DOCUMENTS

| 135,646 | 12/1919 | United Kingdom | 33/76 VA |

*Primary Examiner*—Stephen J. Tomsky
*Attorney, Agent, or Firm*—Robert D. Farkas

[57] ABSTRACT

This disclosure pertains to a navigational computer having three arms slideably and pivotably secured to one another. A pair of compass roses are affixed at the intersection of one arm to each of the adjacent arms. Angularly disposed indicia, on the compass roses, and distance and speed indicating indicia disposed on each of the arms, provide computed data resulting from selective angular displacement of the arms and the utilization of selective portions of the lengths thereof.

9 Claims, 2 Drawing Figures

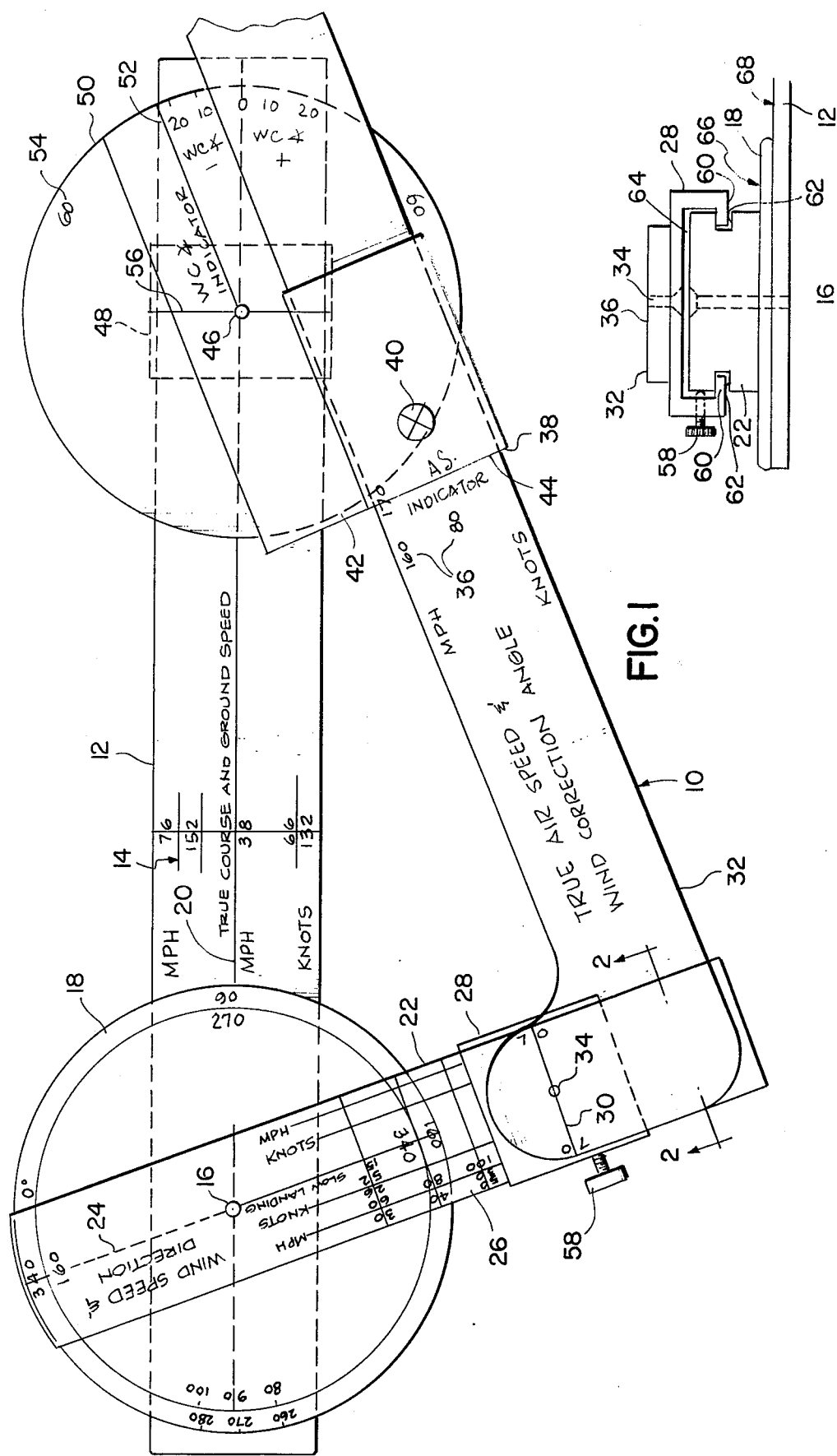
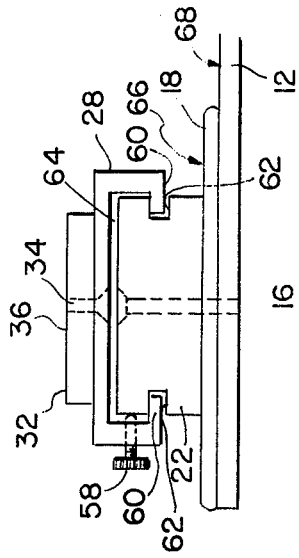
FIG.1
FIG.2

NAVIGATIONAL COMPUTER

BACKGROUND OF THE INVENTION

1. The Field of the Invention

This invention relates to navigational computers and more particularly to that class of apparatus utilizing manual positioning of the component elements thereof.

2. Description of the Prior Art

The prior art abounds with manually operated inexpensive computer devices. U.S. Pat. No. 3,276,682 issued on Oct. 4, 1966 to A. T. Phelps teaches a plurality of interacting circular discs, each having numerical indicia disposed in circular fashion about their marginal edges. Setting a pair of three such interacting discs causes the third disc to assume a resultant angular position, whose indicia is then utilized as the computed data which is read off against a cursor or hair-line secured to the framework of the apparatus.

U.S. Pat. No. 2,775,404 issued on Dec. 25, 1956 to H. R. Lahr discloses a plurality of juxtaposed circular discs, each co-axially aligned about a centermost pivot axis. The outwardly extending portions of layer discs contain indicia disposed thereupon which may be selectively read off in accordance with indicia disposed on the marginal edges of smaller discs. Additionally, windows on an overlying disc expose circularly disposed indicia on the adjacent surface of an underlying disc. Rotation of the discs relative to one another, permits navigational computations to be completed.

All of the aforementioned Patents suffer the common deficiency of utilizing circularly disposed indicia substantially uniformly spaced on the lateral surface of a disc. However, most navigational computations include the need to perform triangular evaluations in which one leg of the triangle is substantially shorter than the remaining two legs. Hence, the use of discs results in either a super expanded scale representation for the length of the shortest leg of the triangle, or alternatively, a substantially crowded circular scale for the remaining two legs of the triangle. Either approach results in a crowded scale with attendant inaccuracies or an extended third scale resulting in an apparatus of unnecessary size.

SUMMARY OF THE INVENTION

A primary object of the present invention is to provide a navigational computer which is convenient to operate and consistently produces accurate computed data therefrom.

Another object of the present invention is to provide a navigational computer which is small in size and easily manually manipulated when in use by a pilot otherwise busily engaged in the operation of the vehicle.

Still another object of the present invention is to provide a three legged triangular computational device in which one of the three legs has a foreshortened distance scale thereupon relative to the other legs, resulting in a uniform scale accuracy for all three legs in combination with a substantially elongated apparatus of convenient size.

There are six basic variables that a navigator is concerned with, when for example, utilizing aerial dead reckoning on board a moving aircraft. These variables include true air speed, which is the relative speed of an aircraft through a body of air; true heading, which is the direction in which the aircraft is pointed; wind speed; wind direction; ground speed; which is the speed of the aircraft with relation to the ground; and true course, which is the patch the aircraft travels over the ground. The navigator of an aircraft has the job of pairing the six above-noted quantities into appropriate vectors, which are then added together to form the wind triangle which is at the very heart of the dead reckoning method of aerial navigation.

The present invention utilizes scales disposed on one arm thereof, indicating ground speed, a scale indicating air speed on another arm thereof, and a wind speed scale disposed on the remaining arm. The length of each arm may be adjusted so as to form a triangle in which each of the three speed elements are accurately deicted. Since the angular relationship between each of the arms is also adjustable upon the selective positioning of each of the arms relative to each other, a pair of compass roses may be utilized to determine the wind direction, true course, and the wind correction angle. The wind correction angle may be defined as the angular relationship between the axis of the air speed arm and the axis of the ground speed arm.

These objects as well as other objects of the present invention, will become more readily apparent after reading the following description of the accompanying drawings.

BRIEF DESCRIPTION OF THE DRAWINGS

FIG. 1 is a plan view of the present invention.

FIG. 2 is a side elevation cross-sectional view taken along line 2—2 viewed in the direction of arrows 2—2 as shown in FIG. 1.

DESCRIPTION OF THE PREFERRED EMBODIMENT

The structure and method of fabrication of the present invention is applicable to a first arm, hereinafter denoted as the ground speed arm, a second arm, hereinafter denoted as a wind speed arm, and a third arm, hereinafter denoted as a true air speed arm. The wind speed arm is pivotably secured at a fixed location to the ground speed arm. The ground speed scale, evidenced by numerical indicia uniformly spaced on the surface thereof, and the wind speed scale, evidenced by numerical indicia uniformly spaced on the surface thereof, both have the zero points on their respective scales coincide at the pivot axis pivotably securing the arms permanently together at a fixed point, defined by the intersection of the center lines of each of the scales. Interposed between the wind speed arm and the ground speed arm and centered about the pivot axis joining them together, is a compass rose which is free to rotate about the pivot axis independent of the regular relationship of the ground speed and wind speed arms. Scribe lines extend along the length of the ground speed and wind speed arms, each passing through the pivot axis, so as to provide hair-line readouts for the compass rose indicia disposed on the surface of the circular disc. The wind speed arm is adapted with a slide which is free to move along the length thereof unless clamped thereto by a threaded thumbscrew passing through the slide so as to compressively engage a side edge of the wind speed arm. The slide pivotably engages one end of the air speed arm so that the air speed arm may rotate about a pivot axis affixed to the wind speed slide disposed centrally selectively along the length of the wind speed arm. The wind speed slide is adapted with a hair line which can be utilized in conjunction with the wind speed indicating indicia disposed on the surface of the wind speed arm.

A ground speed slide is slideably affixed along the length of the ground speed arm and is adapted with a hair line indicating line which may be used in conjunction with the reading of the ground speed calibrating indicia disposed on the face of the ground speed arm. Affixed non-rotatably to the ground speed slide, is a partial compass rose denoting wind correction angles in both the positive and negative directions and having the zero wind correction angle thereof permanently coinciding with the center line extending along the length of the ground speed arm. The wind correction angle indicia is disposed in semi-circular fashion extending a fixed distance radially outwardly from a center point of the ground speed slide.

An air speed slide is slideably affixed along the length of the air speed arm and is adapted with an edge suitable for reading or setting the slide relative to the air speed indicia disposed on the surface of the air speed arm. A locking screw passes through the air speed slide so as to secure it at selective locations along the length of the air speed arm. Affixed to a surface of the air speed slide is a transparent plate. The plate is pivotably secured to the ground speed slide at the point at which the partial compass rose utilized to indicate wind correction angle, is affixed to the ground speed slide. A hair-line extends radially outwarly from the pivot point pivotably securing the plate to the ground speed slide and extends so as to provide a reference line used in reading the wind correction angle indicia disposed on the partial compass rose.

The speed data, disposed upon the wind, ground, and air speed scales may be expressed in terms of speed in miles per hour and knots. Utilizing this technique, the navigator may insert data using one form of speed notation and readout data in another form, or alternatively, mix the forms of inserted data whilst selecting either form for the readout data. In addition, each arm may have sets of scales in which each set has a different speed range than the other sets. It is preferred that if more than one speed range is employed on one arm, that each of the speed ranges may be color coded in the same manner that a matching speed range is color coded on the adjacent arms, thus minimizing the possiblity of an inadvertent use of mismatched ranges.

Now referring to the figures, and more particularly to the embodiment illustrated in FIG. 1 showing the present invention 10, having an extended rectangular arm 12, having indicia 14 thereupon, indicating ground speed in two scales, wherein each scale is in units of miles per hour and knots. The scale increases progressively and linearly moving in a right hand direction away from pivot axis rod 16. Compass rose 18 is pivotably secured to arm 12 about pivot rod 16. The rose is graduated in conventional fashion so as to indicate a total excursion of 360°. An inner scale is in the reverse direction and is 180° out of phase with the outermost scale. Both scales on the compass rose are read relative to a center line 20 disposed along the length of arm 12.

Arm 22 is pivotably secured to pivot rod 16 and has a free end extending in an overlapping relationship with compass rose 18. Dotted line 24 extends along the length of arm 22 and is utilized as a hair-line in conjunction with the innermost and outermost scales disposed on compass 18. Indicia 26 is disposed on the surface of arm 22 and consists of a pair of scales wherein each scale is denoted in units of miles per hour and knots.

Indicia 26 represents wind speed and has a zero value at the intersection of the scales and pivot rod 16. Dotted line 24, when read in conjunction with the scales of compass rose 18 adjacent thereto specifies wind direction. Center line 20 is read in conjunction with the scales on compass rose 18 so as to set in or yield the true course of the vehicle.

Slide 28 is adapted with tongues, not shown, which engage slots, not shown, in arm 22. Slide 28 is free to move along the length of arm 22 in sliding fashion. Thumbscrew 58 threadingly engages a portion of slide 28 and is utilized to clamp slide 28 at a preferred location along the length of arm 22. Slide 28 is preferably fabricated from a transparent material and is adapted with an indicating line 30 which is used in conjunction with indicia 26.

Arm 32 is pivotably secured to slide 28 at pivot rod 34. Arm 32 is fabricated from a transparent plastic material, enabling the user of the present invention to sight through arm 32 and slide 28. Indicia 36 is disposed along the length of arm 32, denoting air speed in scales having units in miles per hour and knots.

Slide 38 is adapted with tongues, not shown, engaging notches, not shown, in arm 32. Arm 32 is permitted to slide relative to the location of slide 38 and may be secured at a preferential location by locking a lockscrew 40 which clamps arm 32 to slide 38. Edge 44 acts as an indicator and is used relative to indicia 36 indicating true air speed.

Transparent plate 42 is fixedly secured to slide 38 and is interposed between slide 38 and arm 12. Pivot rod 46 pivotably engages transparent plate 42 to slide 48, shown in dotted lines. A compass rose 50 is fixedly secured to slide 48 and centered about pivot rod 46. Line 52 is disposed on plate 42 and extends radially outwardly from pivot rod 46. Line 52 serves as an indicator used in conjunction with indicia 54 disposed on the surface of compass rose 50. Since indicia 54 indicates the wind correction angle, a scale arrangement is provided in plus and minus wind correction angles intersecting at a zero wind correction angle permanently aligned over line 20 on arm 12.

Slide 48, is adapted with tongues, not shown, engaged within longitudinal notches, not shown, disposed along the length of arm 12, so that slide 48 and compass rose 50 are both free to move along the length of arm 12. Slide 48 and compass rose 50 are fabricated from transparent materials. Line 56 is used as an indicator in conjunction with indicia 14. The user of the present invention sights through plate 42, compass rose 50 and slide 48 so as to permit line 56 to be set at a preferred location relative to the ground speed scales denoted by indicia 14.

The apparatus therefor consists of arms 12, 22, and 32, each pivotably engaged to adjacent arms, and adapted with scales denoting ground speed, wind speed and true air speed respectively. Indicators 30, 44 and 56 are provided, which enable the user to pick off a desired length on each of the scale notations on each arm. Thus, the angular relationship between the arms and their individual useful lengths are adjusted by the user.

FIG. 2 illustrates arm 32 pivotably engaged to slide 28 along pivot rod 34. Indicia 36 is disposed on the uppermost face of arm 32. Tongues 60 are engaged within slots 62 located in the side walls of arm 22. Thumbscrew 58 is utilized to clamp slide 28 to arm 22. Pivot rod 16 passes through arm 12, compass rose 18, and arm 22, so that they may be rotated relative to one another. The indicia carried by arm 22 is disposed at surface 64. The indicia carried by compass rose 18 is disposed at surface 66 thereon. The indicia carried by arm 12 is disposed at surface 68. Pivot rod 16 is fixedly secured at one point in arm 12.

One of the advantages of the present invention is a navigational computer which is convenient to operate and consistently produces accurate computed data therefrom.

Another object of the present invention is a navigational computer which is small in size and easily manually manipulated when in use by a pilot otherwise busily engaged in the operation of the vehicle.

Still another object of the present invention is a three legged triangular computational device in which one of the three legs has a foreshortened distance scale thereupon relative to the other legs, resulting in a uniform scale accuracy for all three legs in combination with a substantially elongated apparatus of convenient size.

Thus there is disclosed in the above description, and in the drawings, an embodiment of the invention which fully and effectively accomplishes the objects thereof. However, it will become apparent to those skilled in the art, how to make variations and modifications to the instant invention. Therefore, this invention is to be limited not by the specific disclosure herein, but only by the appending claims.

I claim:

1. A navigational computer comprising a first arm carrying indicia denoting a first scale, a second arm, said second arm carrying indicia denoting a second scale, a third arm, said third arm carrying indicia denoting a third scale, a first compass rose, means to pivotably secure one end of said first arm and one end of said second arm and said compass rose to each other, said compass rose being disposed intermediate adjacent faces of said first arm and said second arm, said first compass rose carrying indicia in a first circularly disposed scale, means to slideably and pivotably secure one end of said third arm along a selected portion of a length of said second arm, means to slideably and pivotably engage a selected portion of the length adjacent the other end of said third arm to a selected portion of the length adjacent the other end of said first arm, a second compass rose, said second compass rose being disposed at said selected portion of said length of said first arm, said second compass rose carrying indicia in a second circularly disposed scale, first indicating means for use as a sight in conjunction with said second scale extending across the entire width of said second arm, said first indicating means disposed at said one end of said third arm, second indicating means for use as a sight in conjunction with said third scale extending across the entire width of said third arm, said second indicating means disposed at said selected portion of said length adjacent said other end of said third arm, third indicating means for use as a sight in conjunction with said first scale extending across the entire width of said first arm, said third indicating means disposed at said selected portion of said length adjacent said other end of said first arm, fourth indicating means for use as a sight in conjunction with said first circular scale, said fourth indicating means disposed along the length of said first arm extending radially outwardly from the center of said first compass rose and adjacent said first scale, fifth indicating means for use as a sight in conjunction with said first circular scale, said fifth indicating means disposed parallel to the longitudinal axis of said second arm and extending radially outwardly from the center of said second compass rose, sixth indicating means for use as a sight in conjunction with said second circular scale, said sixth indicating means disposed substantially parallel to the longitudinal axis of said third arm extending radially outwardly from the center of said second compass rose and adjacent said second scale.

2. The navigational computer as claimed in claim 1 wherein said first scale denotes ground speed, said second scale denotes wind speed, said third scale denotes air speed, said first circular scale denotes 360°, said second circular scale denotes wind correction angle, said second circular scale having positive and negative values expressed in degrees centered about a zero degree value, said zero degree value non-rotatably aligned with the longitudinal axis of said first arm.

3. The navigational computer as claimed in claim 1 further comprising means to releasably secure said one end of said third arm to said selected portion of said second arm.

4. The navigational computer as claimed in claim 1 wherein each of said first scale and said second scale and said third scale are expressed in units of miles per hour and knots.

5. The navigational computer as claimed in claim 1 wherein said slideable pivotable securing means comprises a notch, said notch being disposed along a marginal edge of said second arm, said notch extending along the length of said marginal edge, a first plate, said first plate being disposed intermediate said second arm and said third arm, a tongue, said tongue fixedly secured to said first plate, said tongue slideably engaged within said notch, a pivot rod, one end of said pivot rod fixedly secured to said first plate, the other end of said pivot rod pivotally engaged within a hole disposed at said one end of said third arm, said first plate being disposed intermediate adjacent faces of said second arm and said third arm.

6. The navigational computer as claimed in claim 5 further comprises a second plate, means to slideably engage said second plate to said selected portion of the length of said third arm, a third plate, means to slideably engage said third plate to said selected portion of the length of said first arm, a pivot rod, one end of said pivot rod fixedly secured to said third plate, the other end of said pivot rod passing through a hole disposed in said second plate, said second compass rose being fixedly secured to said third plate.

7. The navigational computer as claimed in claim 6 further comprising means to releasably secure said second plate to said selected portions of the length of said third arm.

8. The navigational computer as claimed in claim 1 wherein said second arm and said third arm and said second compass rose and said slideable and pivotable securing means and said slideable and pivotable engaging means are fabricated from transparent materials.

9. The navigational computer as claimed in claim 6 wherein said first indicating means comprises a first sight line being disposed on said first plate, said second indicating means including a second sight line being disposed on said second plate, said third indicating means including a third sight line being disposed on said third plate, said fourth indicating means including a fourth sight line being disposed on said first arm, said fifth indicating means including a fifth sight line being disposed on said second arm, said sixth indicating means including a sixth sight line, being disposed on said second plate, said sixth sight line extending substantially parallel to the longitudinal axis of said third arm.

* * * * *